United States Patent
Saeki (10) Patent No.: US 11,794,526 B2
(45) Date of Patent: Oct. 24, 2023

(54) TYRE

(71) Applicant: Sumitomo Rubber Industries, Ltd., Hyogo (JP)

(72) Inventor: Tetsuro Saeki, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 243 days.

(21) Appl. No.: 17/193,195

(22) Filed: Mar. 5, 2021

(65) Prior Publication Data

US 2021/0316574 A1 Oct. 14, 2021

(30) Foreign Application Priority Data

Apr. 13, 2020 (JP) .................................. 2020-071856

(51) Int. Cl.
 *B60C 11/01* (2006.01)
 *B60C 11/03* (2006.01)
 *B60C 11/12* (2006.01)

(52) U.S. Cl.
 CPC .......... *B60C 11/0306* (2013.01); *B60C 11/01* (2013.01); *B60C 2011/0346* (2013.01);
 (Continued)

(58) Field of Classification Search
 CPC . B60C 11/01; B60C 11/0306; B60C 11/0316; B60C 2011/0341;
 (Continued)

(56) References Cited

U.S. PATENT DOCUMENTS 5,571,351 A * 11/1996 Hatakenaka ............ B60C 11/01
 152/902
2013/0068360 A1* 3/2013 Tamugi ............... B60C 11/0306
 152/209.18

(Continued)

FOREIGN PATENT DOCUMENTS

DE 112014005382 T5 8/2016
DE 112016003386 T5 4/2018

(Continued)

OTHER PUBLICATIONS

The extended European search report issued by the European Patent Office dated Sep. 21, 2021, which corresponds to European Patent Application No. 21165926.3-1012 and is related to U.S. Appl. No. 17/193,195.

*Primary Examiner* — Justin R Fischer
*Assistant Examiner* — Philip N Schwartz
(74) *Attorney, Agent, or Firm* — Studebaker & Brackett PC (57) ABSTRACT

A tyre includes a tread portion including a tyre equator, a tread edge, a tread width which is a distance in a tyre axial direction from the tyre equator to the tread edge, a shoulder land portion including the tread edge. The shoulder land portion is provided with a plurality of first shoulder lateral grooves. Each first shoulder lateral groove includes an inner groove portion extending inwardly in the tyre axial direction of the tread edge and an outer groove portion extending outwardly in the tyre axial direction of the tread edge. Each first shoulder lateral groove, in a tread development view, has a groove area Sb of the outer groove portion extending in a region from the tread edge to an 125% position of the tread width is greater than a groove area Sa of the inner groove portion.

20 Claims, 5 Drawing Sheets

(52) U.S. Cl.
CPC ............ *B60C 2011/0353* (2013.01); *B60C 2011/0365* (2013.01); *B60C 2011/0383* (2013.01); *B60C 2011/0388* (2013.01); *B60C 2011/1209* (2013.01)

(58) Field of Classification Search
CPC ..... B60C 2011/0346; B60C 2011/0353; B60C 2011/0365; B60C 2011/0381; B60C 2011/0383; B60C 2011/0388; B60C 2011/1209
See application file for complete search history.

(56) References Cited

U.S. PATENT DOCUMENTS

2014/0238567 A1    8/2014  Iwasaki et al.
2016/0375728 A1*  12/2016  Kuriyama ............... B60C 11/03
                                                                        152/209.8

FOREIGN PATENT DOCUMENTS

| EP | 2 497 656 A1 | 9/2012 | |
| EP | 2 570 270 A1 | 3/2013 | |
| EP | 3 572 243 A1 | 11/2019 | |
| JP | 2005-162145 A | 6/2005 | |
| JP | 2014-162388 A | 9/2014 | |
| JP | 2014159287 A * | 9/2014 | ............ Y02T 10/86 |

* cited by examiner

TYRE

This application claims the benefit of foreign priority to Japanese Patent Application No. JP2020-071856, filed Apr. 13, 2020, which is incorporated by reference in its entirety.

BACKGROUND ART

Field of the Disclosure

The present disclosure relates to a tyre, and more specifically relates to a tyre for automobile.

Description of the Related Art

The following Patent document 1 discloses a pneumatic tyre capable of improving mud performance and noise performance. The pneumatic tyre includes a middle land portion which is provided with a plurality of inner middle lug grooves and a plurality of outer middle lug grooves, wherein the numbers of these lug grooves are limited.

Patent Document

[Patent document 1] Japanese Unexamined Patent Application Publication 2014-162388

SUMMARY OF THE DISCLOSURE

The inventor attempted to improve off-road performance and noise performance by an approach different from that of Patent Document 1. Specifically, the inventor focused on the fact that shoulder lateral grooves extending across the tread edges have a large effect on on-road noise performance and traction in off-road. Then, by defining a relationship between groove areas of portions with respect to the tread edge of each shoulder lateral groove, the above problem has been solved.

The present disclosure has been made in view of the above circumstances and has a major object to provide a pneumatic tyre capable of improving off-road performance and noise performance In one aspect of the disclosure, a tyre includes a tread portion including a tyre equator, a tread edge, a tread width which is a distance in a tyre axial direction from the tyre equator to the tread edge, and a shoulder land portion including the tread edge, the shoulder land portion being provided with a plurality of first shoulder lateral grooves, each first shoulder lateral groove including an inner groove portion extending inwardly in the tyre axial direction of the tread edge and an outer groove portion extending outwardly in the tyre axial direction of the tread edge, wherein each first shoulder lateral groove, in a tread development view, has a groove area Sb of the outer groove portion extending in a region from the tread edge to an 125% position of the tread width is greater than a groove area Sa of the inner groove portion.

In another aspect of the disclosure, each outer groove portion may include a width-increasing portion in which a groove width thereof increases continuously outwardly in the tyre axial direction from the tread edge.

In another aspect of the disclosure, each inner groove portion has an inner end in the tyre axial direction, and the inner groove portion may include a constant width portion extending from the inner end with a constant width in a predetermined length.

In another aspect of the disclosure, in each first shoulder lateral groove, a ratio Sa/Sb of the groove area Sa of the inner groove portion to the groove area Sb of the outer groove portion may be in a range from 0.15 to 0.40.

In another aspect of the disclosure, the tread portion may further include a shoulder circumferential groove arranged adjacent to the shoulder land portion, wherein the shoulder circumferential groove may include a plurality of curved portions projecting in the tyre axial direction, and the plurality of first shoulder lateral grooves may extend from the curved portion.

In another aspect of the disclosure, in each first shoulder lateral groove, the outer groove portion may include an inner position, an outer position located outwardly in the tyre axial direction from the inner position by 5% to 20% of the tread width, and an intermediate position located at a center between the inner position and the outer position in the tyre axial direction, and a ratio (Hb/Ha) of a groove width Hb in a tyre circumferential direction of the intermediate position to a groove width Ha in the tyre circumferential direction of the inner position may be smaller than a ratio (Hc/Hb) of a groove width Hc in the tyre circumferential direction of the outer position to the groove width Hb.

In another aspect of the disclosure, the ratio (Hc/Hb) may be equal to or less than 4.0, and the ratio (Hb/Ha) may be equal to or more than 1.0.

In another aspect of the disclosure, the shoulder land portion may further be provided with second shoulder lateral grooves arranged between the first shoulder lateral grooves, and third shoulder lateral grooves arranged between the first shoulder lateral grooves and the second shoulder lateral grooves, wherein each third shoulder lateral groove may be located outside the tread edge in the tyre axial direction.

In another aspect of the disclosure, each third shoulder lateral groove may include an axial portion extending in the tyre axial direction from an inner end thereof in the tyre axial direction, and a bent portion bent with respect to the axial portion at a location between an 117% position and an 120% position of the tread width so as to extend toward one of the first shoulder lateral grooves which is adjacent to the axial portion.

In another aspect of the disclosure, the third shoulder lateral grooves may be communicated with the respective first shoulder lateral grooves at a location in the tyre axial direction between an 122% position of the tread width and the 125% position of the tread width.

DESCRIPTION OF THE PREFERRED EMBODIMENTS

An embodiment of the present disclosure will be explained below with reference to the accompanying drawings.

Figure 1:
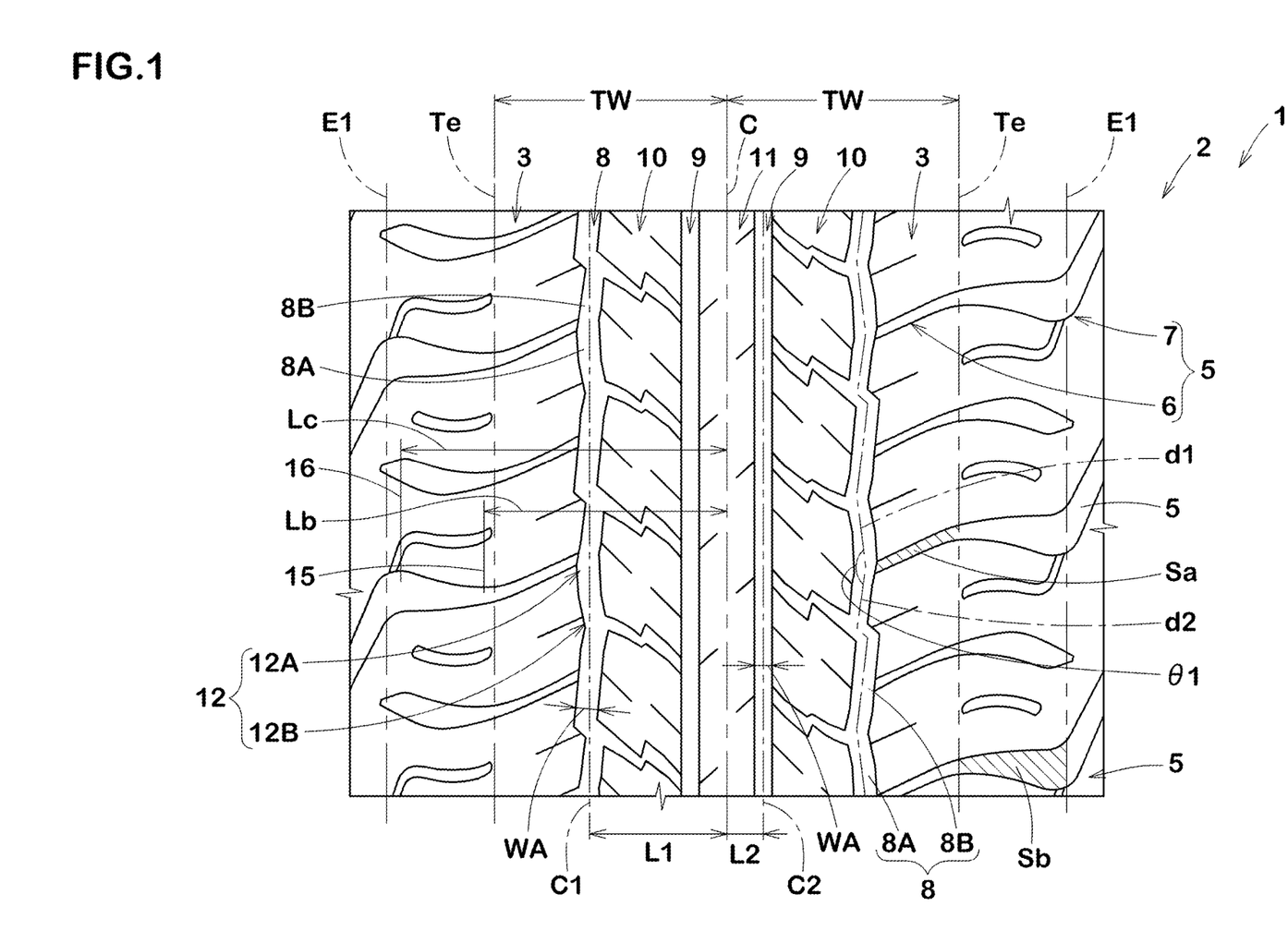
FIG. 1 is a development view of a tread portion according to an embodiment of the present disclosure.

FIG. 1 is a development view of a tread portion 2 of a tyre 1 according to an embodiment of the present disclosure. Note that the drawings are not always drawn to the correct scale. In FIG. 1, a pneumatic tyre for passenger car is illustrated. Note that the present disclosure may be embodied as other category tyres such as a pneumatic tyre for heavy-duty vehicle.

As illustrated in FIG. 1, in the present embodiment, the tread portion 2 of the tyre 1 includes at least one or more shoulder land portions 3 having respective tread edges Te. In the present embodiment, a pair of axially spaced shoulder land portions 3 is provided.

As used herein, when the tyre is a pneumatic tyre, the "tread edges" Te are the axial outermost edges of the ground contacting patch of the tyre 1 which occurs under a normal loaded condition such that the tyre under a normal state is grounded on a plane with a standard tyre load at zero camber angles. As used herein the "normal state" is such that the tyre is mounted onto a standard wheel rim (not illustrated) with a standard pressure but loaded with no tyre load. Unless otherwise noted, dimensions of portions of the tyre 1 are values measured under the normal state. As used herein, a distance in the tyre axial direction between the tyre equator C and a respective one of the tread edges Te is defined as the tread width TW.

As used herein, the "standard wheel rim" is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tyre by standards organizations on which the tyre is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As used herein, the "standard tyre load" is a tyre load officially approved for each tyre by standards organizations in which the tyre is based, wherein the standard tyre load is the "maximum load capacity" in JATMA, the maximum value given in the above-mentioned table in TRA, and the "Load Capacity" in ETRTO, for example.

In the present embodiment, each shoulder land portion 3 is provided with a plurality of first shoulder lateral grooves 5. The first shoulder lateral grooves 5 may be helpful to generate a large traction in off-road such as muddy road, thus improving off-road performance. The plurality of first shoulder lateral grooves 5 is spaced in the tyre circumferential direction.

Each first shoulder lateral groove 5 includes an inner groove portion 6 extending inwardly in the tyre axial direction of the tread edge Te and an outer groove portion 7 extending outwardly in the tyre axial direction of the tread edge Te.

Noise during on-road driving includes air pumping noise generated which is to be generated by the air in the shoulder lateral grooves being discharged through the tread edge Te outwardly of the tyre. This noise can be reduced by making the volume of area of the shoulder lateral grooves located inwardly in the tyre axial direction than the tread edge Te. Further, through the results of many experiments, it was found that when driving on muddy road, tyres basically contact with muddy ground up to about an 125% position E1 of the tread width TW away from the tyre equator in a tread development view. That is, when the groove volume between the tread edge Te and the 125% position E1 that is away from the tyre equator C at an axial distance of 125% of the tread width TW is increased, traction in off-road can be increased without affecting air pumping noise. Thus, in the present embodiment, each first shoulder lateral groove 5, in a tread development view, has a groove area Sb of the outer groove portion 7 extending in a region from the tread edge Te to the 125% position E1 is greater than a groove area Sa of the inner groove portion 6. Therefore, off-road performance and noise performance of the tyre can be improved. Note that the groove areas Sa and Sb are hatched in FIG. 1.

Figure 2:
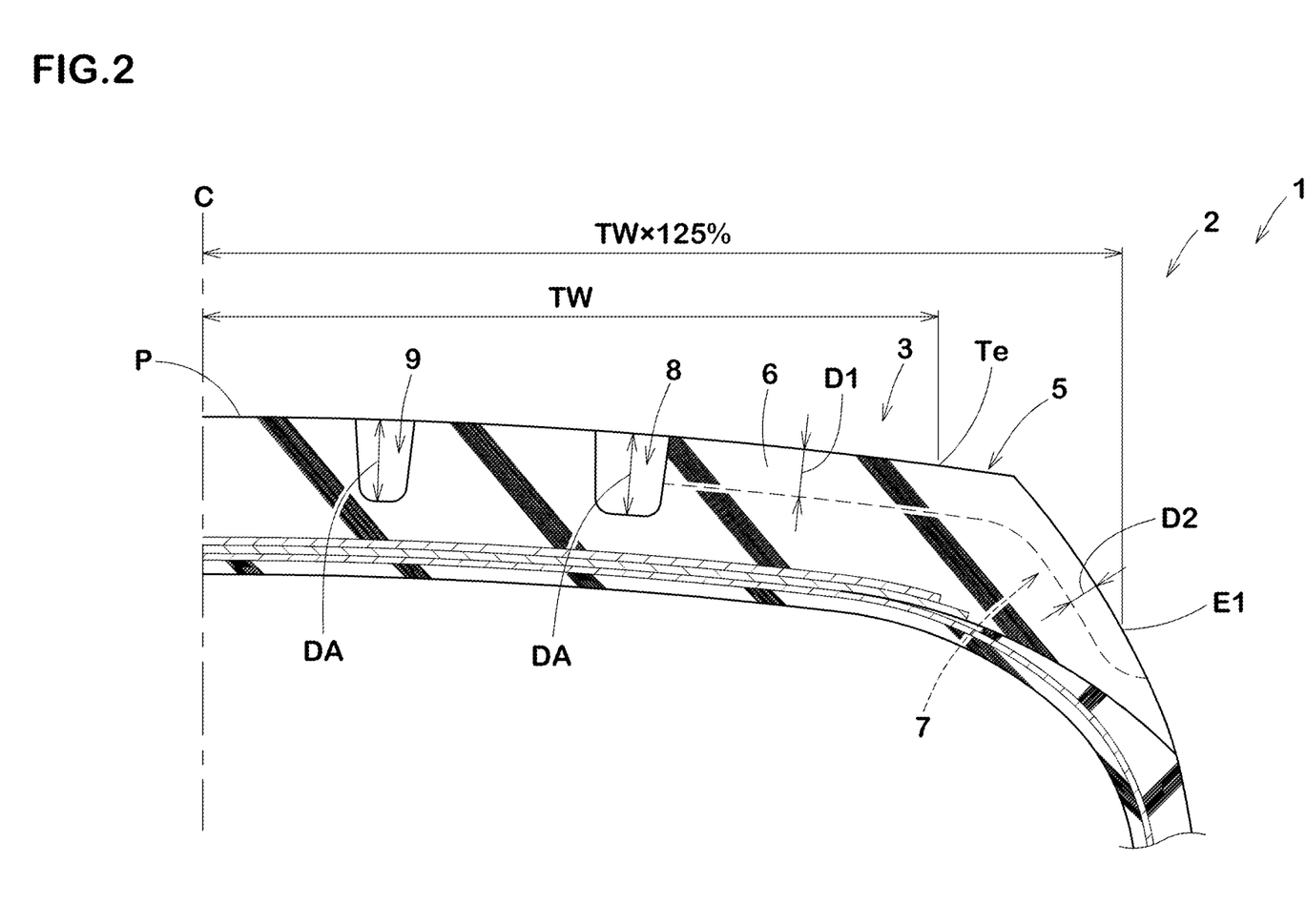
FIG. 2 is a schematic cross-sectional view of the right half of the tread portion according to the present disclosure.

FIG. 2 is a schematic cross-sectional view of the right half of the tread portion 2 under the normal state. As illustrated in FIG. 2, the 125% position E1 of the tyre is a position away from the tyre equator C outwardly in the tyre axial direction by a distance of 125% of the tread width TW. The 125% position E1 is the position that does not come into contact with the ground during on-road driving such as on asphalt road. The profile P of the tread portion 2 of the tyre 1 according to the present embodiment is inclined with respect to the tyre axial direction such that a height of the tyre becomes smaller toward axially outside.

In order to further improve off-road performance and noise performance, in each first shoulder lateral groove 5, a ratio Sa/Sb of the groove area Sa of the inner groove portion 6 to the groove area Sb of the outer groove portion 7 is preferably equal to or more than 0.15, more preferably equal to or more than 0.20, still further preferably equal to or more than 0.25. On the other hand, the ratio Sa/Sb is preferably equal to or less than 0.40, more preferably equal to or less than 0.35, still further preferably equal to or less than 0.30.

As illustrated in FIG. 1, in the present embodiment, the tread portion 2 is further provided with a pair of shoulder circumferential grooves 8 each adjacent to a respective one of the shoulder land portions 3, and a pair of crown circumferential grooves 9 each arranged between the tyre equator C and a respective one of the pair of shoulder circumferential grooves 8. Thus, the tread portion 2, in the present embodiment, further includes a pair of middle land portions 10 defined between the shoulder circumferential grooves 8 and crown circumferential grooves 9, and a crown land portion 11 define between the pair of crown circumferential grooves 9. Note that the tread portion 2 is not limited to the above aspect.

The shoulder circumferential grooves 8 and the crown circumferential grooves 9, in the present embodiment, extend continuously in the tyre circumferential direction. The shoulder circumferential grooves 8, for example, extend in a zigzag manner in the tyre circumferential direction. The crown circumferential grooves 9, for example, extend straight in the tyre circumferential direction, i.e., each having a pair of straightly extending groove edges in parallel with the tyre circumferential direction.

Each shoulder circumferential groove 8, in the present embodiment, includes a plurality of first inclined portions 8A inclined with respect to the tyre circumferential direction in a first direction (downward to the right in FIG. 1), and a plurality of second inclined portions 8B inclined with respect to the tyre circumferential direction in a second direction (downward to the left in FIG. 1) which is opposite to the first direction. The first inclined portions 8A and the second inclined portions 8B, for example, are arranged alternately in the tyre circumferential direction.

Each shoulder circumferential groove 8, in the present embodiment, includes a plurality of curved portions 12 in which the first inclined portions 8A and the second inclined portions 8B are communicated with one another so as to project in the tyre axial direction. The curved portions 12, for example, include the outer curved portions 12A projecting outwardly in the tyre axial direction and inner curved portions 12B projecting inwardly in the tyre axial direction.

In each outer curved portion 12A, a bending angle θ1 between the adjacent first and second inclined portions 8A and 8B is preferably equal to or more than 140 degrees, more preferably equal to or more than 150 degrees, but preferably equal to or less than 175 degrees, more preferably equal to or less than 170 degrees. Such a shoulder circumferential groove 8 can increase traction in off-road and reduce air column resonance in the groove 8. As used herein, the bending angle θ1 is an intersecting angle between adjacent groove centerlines d1 and d2 of the first inclined portion 8A and the second inclined portion 8B, respectively.

Preferably, groove widths WA of the shoulder circumferential grooves 8 and the crown circumferential grooves 9, for example, are in a range from 5% to 15% the tread width TW. Note that the groove width WA of each shoulder circumferential groove 8 is an average value of the maximum and minimum groove widths thereof. Preferably, groove depths DA of the shoulder circumferential grooves 8 and the crown circumferential grooves 9 (shown in FIG. 2), for example, are in a range from 7.0 to 8.0 mm. Preferably, a distance L1 in the tyre axial direction between the tyre equator C and a groove centerline C1 of a respective one of the shoulder circumferential grooves 8 is in a range from 50% to 70% the tread width TW. Note that the groove centerline of each shoulder lateral groove 8 according to the present embodiment is defined as a centerline of the zigzag amplitude thereof. Preferably, a distance L2 in the tyre axial direction between the tyre equator C and a groove centerline C2 of a respective one of the crown circumferential grooves 9 is in a range from 5% to 25% the tread width TW.

Figure 3:
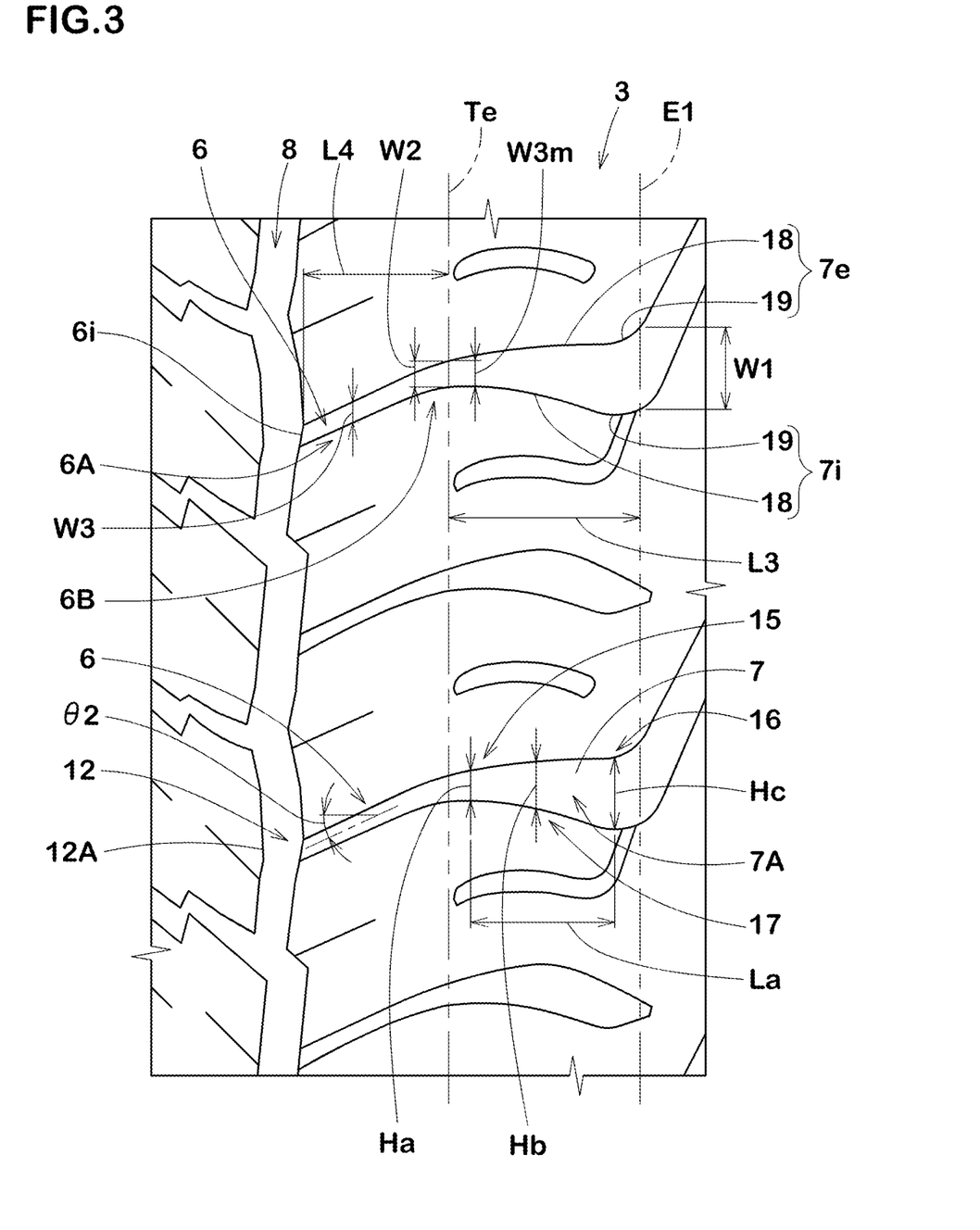
FIGS. 3 and 4 are enlarged plan views of the tread portion.

FIG. 3 is an enlarged plan view of one of the shoulder land portions 3 of FIG. 1. As illustrated in FIG. 3, each outer groove portion 7 according to the present embodiment includes a width-increasing portion 7A in which a groove width thereof, which is measured in parallel with the tyre circumferential direction, increases continuously outwardly in the tyre axial direction from the tread edge Te. Such an outer groove portion 7 can exhibit superior mud discharging performance and powerful traction. The outer groove portion 7, for example, is configured as the width-increasing portion 7A over a region from the tread edge Te to the 125% position E1, thus the above-mentioned effect can be improved further. Preferably, a length L3 in the tyre axial direction of the width-increasing portion 7A is equal to or more than 15% the tread width TW, more preferably equal to or more than 20%, still further preferably equal to or more than 22%.

In the present embodiment, each outer groove portion 7 includes an inner position 15, an outer position 16 located outwardly in the tyre axial direction from the inner position by a distance La of 5% to 20% of the tread width TW, and an intermediate position 17 located at a center between the inner position 15 and the outer position 16 in the tyre axial direction.

In each outer groove portion 7, a ratio (Hb/Ha) of a groove width Hb in the tyre circumferential direction of the intermediate position 17 to a groove width Ha in the tyre circumferential direction of the inner position 15 is, for example, smaller than a ratio (Hc/Hb) of a groove width Hc in the tyre circumferential direction of the outer position 16 to the groove width Hb. In other words, the change in groove width from the intermediate position 17 to the outer position 16 is larger than the change in the groove width from the inner position 15 to the intermediate position 17. Thus, mud discharging performance of each outer groove portion 7 can be improved, resulting in improving off-road performance. When off-road driving, the inner positions 15 typically contact a deeper layer of the ground than the outer positions 16. Thus, by setting the ratio (Hb/Ha) being lower than the ratio (Hc/Hb), the inner positions 15 can compress mud and/or soil down strongly and increase mud shearing force to improve traction.

When the ratio (Hc/Hb) becomes excessively high, stiffness of the shoulder land portion 3 may lower, and thus traction in off-road driving may decrease. From this view point, the ratio (Hc/Hb) is preferably equal to or less than 4.0, more preferably equal to or less than 3.0, still further preferably equal to or less than 2.0. In addition, in order to further improve mud discharging performance, the ratio (Hb/Ha) is preferably equal to or more than 1.0, more preferably equal to or more than 1.2, still further preferably equal to still more than 1.3.

The inner position 15, for example, is positioned away from the tyre equator C by an axial distance Lb (shown in FIG. 1) in a range from 102% to 112% the tread width TW. This inner position 15, when on-road traveling, is a position that may come into contact with the ground during cornering where a large lateral force acts. The outer position 16, for example, is positioned away from the tyre equator C by an axial distance Lc in a range from 117% to 122% the tread width TW. This outer position 6, when on-road driving, is a position that may not come into contact with the ground.

Referring back to FIG. 3, although not particularly limited, a groove width W1 in the tyre circumferential direction of each outer groove portion 7 at the 125% position E1 is preferably in a range from 2.5 to 4.0 times a groove width W2 in the tyre circumferential direction of the outer groove portion 7 at the tread edge Te. The groove width W2 of each outer groove portion 7 at the tread edge Te, for example, is preferably in a range from 45% to 65% the groove width WA of a respective one of the respective shoulder circumferential grooves 8.

Each outer groove portion 7 includes a first groove edge 7e and a second groove edge 7i both extending in the tyre axial direction. In the present embodiment, each of the first groove edge 7e and the second groove edge 7i is configured as a curve line that includes a convex portion 18 that is convex to one side in the tyre circumferential direction (upper side in FIG.) with respect to a tyre axial line and a concave portion 19 that is concave with respect to the tyre axial line. The convex portion 18 and the concave portion 19, for example, both draw a smooth circular line. In each of the first groove edge 7e and the second groove edge 7i, in the present embodiment, the convex portion 18 and the concave portion 19 are connected smoothly. Such an outer groove portion 7 with the first and second groove edges can discharge mud smoothly through the 125% position E1.

In the present embodiment, each inner groove portion 6 has an inner end 6i in the tyre axial direction, and the inner groove portion 6 includes a constant width portion 6A extending from the inner end 6i with a constant width W3 in a predetermined length. The constant width portion 6A may be helpful to generate less noise during driving. As used herein, the constant width portion 6A means not only a portion having a constant groove according to the dictionary sense, but also a portion in which the minimum value of the groove width W3 is 90% or more of the maximum value of the groove width W3 at 50% or more of the length L4 in the tyre axial direction of the inner groove portion 6.

Each inner groove portion 6, for example, further includes an inner width-increasing portion 6B that is connected to the constant width portion 6A and that has a groove width increasing continuously outward in the tyre axial direction. The inner width-increasing portion 6B has a smaller length in the tyre axial direction than that of the constant width portion 6A. Thus, reduction of noise performance can be prevented.

Preferably, the maximum groove width W3$m$ of the inner groove portion 6, which corresponds to the groove width W2, is in a range from 120% to 140% of the groove width W3 of the constant width portion 6A. The inner groove portion 6 with the maximum groove width W3$m$ equal to or more than 120% the groove width W3 of the constant width portion 6A can discharge mud outward of the tyre through the tread edge Te smoothly. In addition, the inner groove portion 6 with the maximum groove width W3$m$ equal to or less than 140% the groove width W3 of the constant width portion 6A can generate less noise during driving.

Preferably, a groove depth D1 of each inner groove portion 6 (shown in FIG. 2) is in a range from 80% to 90% a groove depth DA of the shoulder circumferential groove 8. Preferably, a groove depth D2 of each outer groove portion 7 is in a range from 10% to 15% the groove depth DA of the shoulder circumferential groove 8.

Preferably, the constant width portion 6A of each inner groove portion 6 is inclined at an angle θ2 equal to or more than 20 degrees with respect to the tyre axial direction, more preferably equal to or more than 25 degrees. The angle θ2 is preferably equal to or less than 40 degrees, more preferably equal to or less than 30 degrees.

In each side of the tyre equator C, the first shoulder lateral grooves 5, in the present embodiment, extend from the shoulder circumferential groove 8. Such first shoulder lateral grooves 5 may guide mud in the inner groove portion 6 to the shoulder circumferential groove 8, leading to better mud discharge performance.

The first shoulder lateral grooves 5, for example, extend from the curved portions 12. The first shoulder lateral grooves 5, in the present embodiment, extend from the outer curved portions 12A. Such first shoulder lateral grooves 5 can reduce air column resonance to be generated in the shoulder circumferential groove 8 during driving on on-road.

Figure 4:
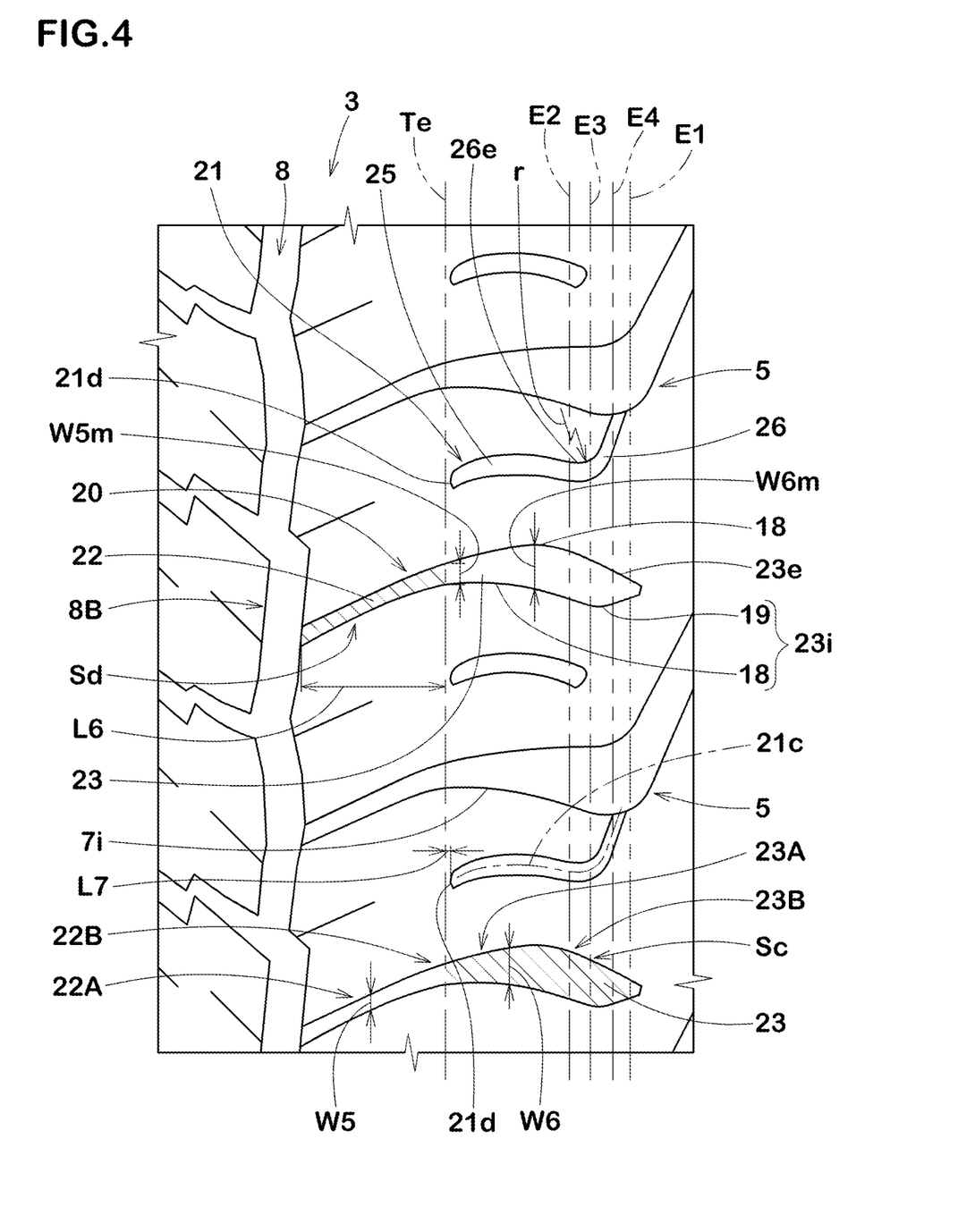

FIG. 4 is an enlarged plan view of one of the shoulder land portions 3 of FIG. 1. As illustrated in FIG. FIG. 4, the shoulder land portion 3, for example, is further provided with second shoulder lateral grooves 20 and third shoulder lateral grooves 21. Each second shoulder lateral groove 20, in the present embodiment, is arranged between two adjacent first shoulder lateral grooves 5 in a tyre circumferential direction of the first shoulder lateral grooves 5. Each third shoulder lateral groove 21 is arranged between one of the first shoulder lateral grooves 5 and one of the second shoulder lateral grooves 20 which are adjacent in the tyre circumferential direction. Each third shoulder lateral groove 21 is located outside the tread edge Te in the tyre axial direction. The second shoulder lateral grooves 20 and the third shoulder lateral grooves 21 can improve traction in off-road driving.

In the present embodiment, the second shoulder lateral grooves 20 extend outwardly in the tyre axial direction from the shoulder circumferential groove 8 beyond the 125% position E1. The second shoulder lateral grooves 20, for example, are communicated with middle positions in the tyre circumferential direction of the respective second inclined portions 8B.

Each second shoulder lateral groove 20 includes a second inner groove portion 22 extending inward in the tyre axial direction of the tread edge Te and a second outer groove portion 23 extending outward in the tyre axial direction of the tread edge Te. In each second shoulder lateral groove 20, a groove area Sc of the second outer groove portion 23 between the tread edge Te and the 125% position E1 is greater than a groove area Sd of the second inner groove portion 22. Thus, off-road performance and noise performance can further be improved. Note that the groove areas Sc and Sd are hatched in FIG. 4.

Although not particularly limited, a ratio (Sd/Sc) of the groove area Sd of the second inner groove portion 22 to the groove area Sc of the second outer groove portion 23 is preferably equal to or more than 0.20, more preferably equal to or more than 0.25. Further, the ratio (Sd/Sc) is preferably equal to or less than 0.35, more preferably equal to or less than 0.30. Preferably, the ratio (Sd/Sc) may be greater than the ratio (Sa/Sb) in order to further improve noise performance and off-road performance.

Each second inner groove portion 22 has a groove width W5 which may vary. For example, each second inner portion 22 may include a second constant width portion 22A in which the groove width W5 has a constant width and extends outward in the tyre axial direction from the shoulder circumferential groove 8 in a predetermined length and a second inner width-increasing portion 22B in which the groove width W5 increases continuously outwardly in the tyre axial direction. The second inner width-increasing portion 22B is connected to the second constant width portion 22A and has a length in the tyre axial direction shorter than that of the second constant width portion 22A. Such a second inner groove portion 22 can generate less noise, and can guide mud in the second inner groove portion 22 toward the second outer groove portion 23 smoothly when driving in mud. As used herein, the second constant width portion 22A means not only a portion having a constant groove according to the dictionary sense, but also a portion in which the minimum value of the groove width W5 is 90% or more of the maximum value of the groove width W5 at 50% or more of the length L6 in the tyre axial direction of the second inner groove portion 22.

Each second outer groove portion 23 may have a groove width W6 which may vary. For example, each second outer groove portion 23, in the present embodiment, may include a second width-increasing portion 23A in which the groove width W6 increases continuously outwardly in the tyre axial direction and a second width-decreasing portion 23B in which the groove width W6 decreases outwardly in the tyre axial direction. The second width-increasing portion 23A is connected to the second width-decreasing portion 23B smoothly.

The second outer groove portion 23, for example, includes a third groove edge 23$e$ and a fourth groove edge 23$i$ both extending in the tyre axial direction. The third groove edge 23$e$ is configured as a curve line consisting of a convex portion 18 that is convex to one side in the tyre circumferential direction (upper side in FIG. 4) with respect to a tyre axial line. The fourth groove edge 23$i$, for example, is configured as a curve line that includes a convex portion 18 and a concave portion 19 that is concave to the other side in the tyre circumferential direction with respect to a tyre axial line which are connect smoothly with one another.

Preferably, the maximum groove width W5$m$ of the second inner groove portion 22, for example, is equal to or more than 120% the groove width W5 of the second constant width portion 22A, but preferably equal to or less than 160%. Preferably, the maximum groove width W6$m$ in the tyre circumferential direction of the second outer groove portion 23, for example, is equal to or more than 2.5 times the groove width W5 of the second constant width portion 22A, but preferably equal to or less than 4.0 times. Preferably, a groove depth of the second inner groove portion 22 is in a range from 90% to 110% the groove depth D1 of the inner groove portion 6. Preferably, a groove depth of the second outer groove portion 23 is in a range from 90% to 110% the groove depth D2 of the outer groove portion 7.

Each third shoulder lateral groove 21, in the present embodiment, includes an axial portion 25 extending outwardly in the tyre axial direction from an inner end 21d and a bent portion 26 connected to the axial portion 25 and bent with respect to the axial portion so as to extend toward one of the first shoulder lateral grooves 5 which is adjacent to the axial portion 25. Preferably, a distance L7 in the tyre axial direction between the inner end 21d of the third shoulder lateral groove 21 and the tread edge Te is equal to or less than 5% the tread width TW. Such a third shoulder lateral groove 21 can reduce air pumping noise when driving on on-road and improve traction in off-road.

The bent portion 26, for example, is bent at a location between an 117% position E2 and an 120% position E3 of the tread width TW. Such third shoulder lateral grooves 21 may ensure sufficient length in the tyre axial direction of the axial portion 25, thus improving traction in off-road driving. As used herein, the location of bending of the bent portion is defined as a position where a radius of curvature (r) of a groove edge 26e of the bent portion 26 becomes minimum.

The third shoulder lateral grooves 21, for example, are communicated with the respective first shoulder lateral grooves 5 at a location between an 122% position E4 of the tread width TW and the 125% position E1. Such third shoulder lateral grooves 21 can ensure sufficient length in the tyre axial direction thereof, thus improving traction. As used herein, a connecting location of each third shoulder lateral groove 21 with the respective first shoulder lateral groove 5 is defined as a position where a groove centerline 21c of the third shoulder lateral groove 21 intersects the second groove edge 7i of the outer groove portion 7.

Figure 5:
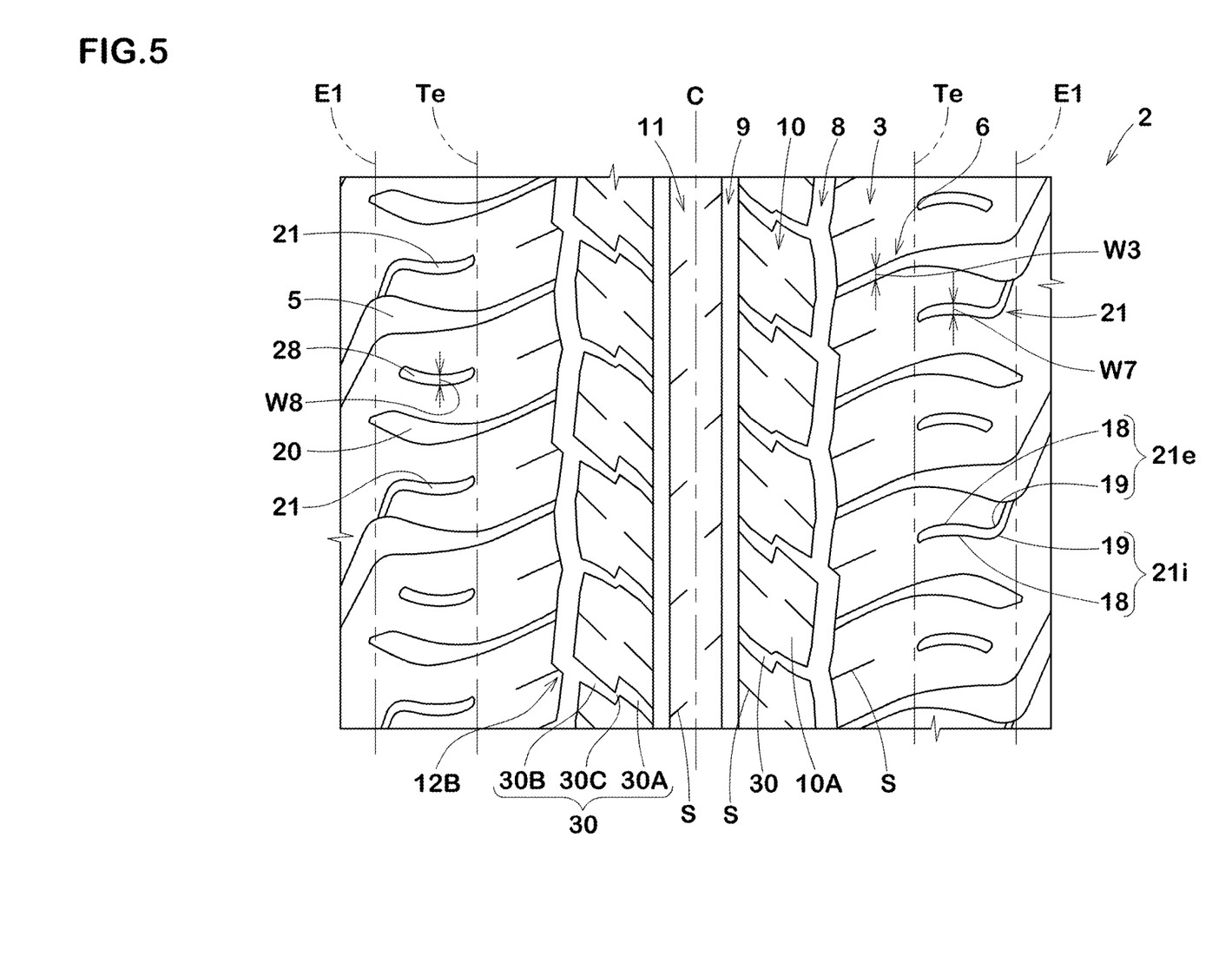
FIG. 5 is a development view of the tread portion.

FIG. 5 is a development view of the tread portion 2. As illustrated in FIG. 5, each third shoulder lateral groove 21, for example, includes a fifth groove edge 21e and a sixth groove edge 21i both extending in the tyre axial direction. In the present embodiment, each of the fifth groove edge 21e and the sixth groove edge 21i is configured as a curve line that includes a convex portion 18 that is convex to one side in the tyre circumferential direction with respect to a tyre axial line (upper side in FIG.) and a concave portion 19 that is concave with respect to the tyre axial line. The convex portion 18 and the concave portion 19, for example, both draw a smooth circular line.

Preferably, a groove width W7 of the third shoulder lateral grooves 21 is equal to or more than 80% the groove width W3 of the inner groove portion 6, but preferably equal to or less than 125%. Preferably, a groove depth of the third shoulder lateral grooves 21 is in a range from 90% to 110% the groove depth D2 of the outer groove portion 7.

The shoulder land portion 3, in the present embodiment, is further provided with fourth shoulder lateral grooves 28 each arranged between one of the second shoulder lateral grooves 20 and one of the first shoulder lateral grooves 5 which are adjacent with one another.

The fourth shoulder lateral grooves 28, in the present embodiment, extends in the tyre axial direction within a region between the tread edge Te and the 125% position E1. The fourth shoulder lateral grooves 28, for example, do not traverse the tread edge Te as well as the 125% position E1. The fourth shoulder lateral grooves 28 may generate less air pumping noise and improve off-road performance.

Preferably, a groove width W8 of the fourth shoulder lateral grooves 28 is in a range from 80% to 125% the groove width W7 of the third shoulder lateral grooves 21. Preferably, a groove depth of the fourth shoulder lateral grooves 28 is in a range of from 90% to 110% the groove depth D2 of the outer groove portion 7.

The middle land portions 10 according to the present embodiment are provided with a plurality of middle lateral grooves 30 extending from the shoulder circumferential groove 8 to the crown circumferential grooves 9, and thus the middle land portions 10 are configured as brock rows of a plurality of middle blocks 10A. The middle lateral grooves 30, for example, are communicated with the respective inner curved portions 12B of the shoulder circumferential grooves 8.

Each middle lateral groove 30 includes a middle inner groove portion 30A connected to the crown circumferential groove 9, a middle outer groove portion 30B connected to the shoulder circumferential groove 8, and a middle center groove portion 30c connecting the middle inner groove portion 30A with the middle outer groove portion 30B. The middle inner groove portion 30A and the middle outer groove portion 30B are inclined with respect to the tyre axial direction in a first direction (downward right in FIG. 5). The middle center groove portion 30C is inclined with respect to the tyre axial direction in an opposite direction to the middle inner groove portion 30A. Such a zigzag middle lateral groove 30 can reduce air pumping noise during driving on on-road.

The crown land portion 11, in the present embodiment, is formed as a plain rib where no grooves are provided, thereby improving noise performance.

The shoulder land portion 3, the middle land portions 10 and the crown land portion 11 are provided with sipes S. The sipes S are narrow cuts that have a width less than 1.5 mm and are distinguish from grooves that have a groove width equal to or more than 1.5 mm. The sipes S can reduce stiffness of the respective land portions 3, 10 and 11, resulting in reducing impact noise due to the land portions coming into contact with the ground.

Although some preferred embodiments of the present disclosure have been described in detail above, the present disclosure is not limited to the above-mentioned specific embodiments, but can be modified various aspects within the scope of the claims.

[Example]

Pneumatic tyres of size 195/80R15 with the basic tread pattern of FIG. 3 were prototyped based on the specifications in Table 1. Then, off-road performance and noise performance of each tyre were tested. The common specifications and test methods for these test tyres are as follows. Note that these test tyres have the same specification with respect to the shape of the inner groove portions and the groove area Sa as with each other.

Lb: 104% of the tread width TW

Lc: 120% of the tread width TW

Off-Road Performance Test:

Each test tyre was installed on all wheels of the following vehicles. Then, a test driver drove this vehicle on an off-road test course to evaluate steering stability and traction by the sensuality of the test driver. The results are shown in Table 1 with a score of 100 for Reference 1. The higher the number, the better.

Vehicle: a four-wheel-drive passenger car with displacement of 660 cc

Rim size: 5.5J tyre inner pressure: 180 kPa

Noise Performance Test:

A test driver drove the above-mentioned vehicle on a dry asphalt test course to evaluate running noise generated from the tyres by the sensuality of the test driver. The results are shown in Table 1 with a score of 100 for reference 1. The higher the number, the better.

Table 1 shows the test results.

TABLE 1

|  | Ref. 1 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Sa/Sb | 1.0 | 0.40 | 0.50 | 0.15 | 0.10 | 0.28 | 0.30 | 0.28 | 0.28 | 0.28 |
| Hb/Ha | 1.3 | 1.3 | 1.3 | 1.3 | 1.3 | 1.3 | 1.8 | 1.0 | 1.3 | 1.3 |
| Hc/Hb | 1.6 | 1.6 | 1.6 | 1.6 | 1.6 | 1.6 | 2.5 | 1.0 | 1.6 | 1.6 |
| θ1 (deg.) | 160 | 160 | 160 | 160 | 160 | 160 | 160 | 160 | 180 | 180 |
| θ2 (deg.) | 28 | 28 | 28 | 28 | 28 | 28 | 28 | 28 | 28 | 45 |
| Off-road performance (score) | 100 | 118 | 115 | 120 | 122 | 120 | 120 | 115 | 115 | 113 |
| Noise performance (score) | 100 | 105 | 106 | 103 | 100 | 104 | 102 | 104 | 102 | 102 |

As a result of the test, it is confirmed that the tyres of the examples are excellent in off-road performance and noise performance.

What is claimed is:

1. A tyre comprising:
a tread portion comprising a tyre equator, a tread edge, a tread width which is a distance in a tyre axial direction from the tyre equator to the tread edge, and a shoulder land portion comprising the tread edge, the shoulder land portion being provided with a plurality of first shoulder lateral grooves,
each first shoulder lateral groove comprising an inner groove portion extending inwardly in the tyre axial direction of the tread edge and an outer groove portion extending outwardly in the tyre axial direction of the tread edge, wherein
each first shoulder lateral groove, in a tread development view, has a groove area Sb of the outer groove portion extending in a region from the tread edge to an 125% position of the tread width that is greater than a groove area Sa of the inner groove portion,
the shoulder land portion is further provided with second shoulder lateral grooves arranged between the first shoulder lateral grooves, and third shoulder lateral grooves arranged between the first shoulder lateral grooves and the second shoulder lateral grooves,
each third shoulder lateral groove is located outside the tread edge in the tyre axial direction; and
each third shoulder lateral groove has an outer end portion which is connected to the outer groove portion of the first shoulder lateral groove.

2. The tyre according to claim 1, wherein
each outer groove portion comprises a width-increasing portion in which a groove width thereof increases continuously outwardly in the tyre axial direction from the tread edge.

3. The tyre according to claim 1, wherein
each inner groove portion has an inner end in the tyre axial direction, and the inner groove portion comprises a constant width portion extending from the inner end with a constant width in a predetermined length.

4. The tyre according to claim 1, wherein
in each first shoulder lateral groove, a ratio Sa/Sb of the groove area Sa of the inner groove portion to the groove area Sb of the outer groove portion is in a range from 0.15 to 0.40.

5. The tyre according to claim 1,
the tread portion further comprising a shoulder circumferential groove arranged adjacent to the shoulder land portion, wherein
the shoulder circumferential groove comprises a plurality of curved portions projecting in the tyre axial direction, and the plurality of first shoulder lateral grooves extends from the curved portion.

6. The tyre according to claim 1, wherein
in each first shoulder lateral groove, the outer groove portion comprises an inner position, an outer position located outwardly in the tyre axial direction from the inner position by 5% to 20% of the tread width, and an intermediate position located at a center between the inner position and the outer position in the tyre axial direction, and
a ratio (Hb/Ha) of a groove width Hb in a tyre circumferential direction of the intermediate position to a groove width Ha in the tyre circumferential direction of the inner position is smaller than a ratio (Hc/Hb) of a groove width Hc in the tyre circumferential direction of the outer position to the groove width Hb.

7. The tyre according to claim 6, wherein
the ratio (Hc/Hb) is equal to or less than 4.0, and the ratio (Hb/Ha) is equal to or more than 1.0.

8. The tyre according to claim 1, wherein
each third shoulder lateral groove comprises an axial portion extending in the tyre axial direction from an inner end thereof in the tyre axial direction, and a bent portion bent with respect to the axial portion at a location between an 117% position and an 120% position of the tread width so as to extend toward one of the first shoulder lateral grooves which is adjacent to the axial portion.

9. The tyre according to claim 1, wherein
the third shoulder lateral grooves are communicated with the respective first shoulder lateral grooves at a location in the tyre axial direction between an 122% position of the tread width and the 125% position of the tread width.

10. The tyre according to claim 2, wherein
a groove width W1 in the tyre circumferential direction of each outer groove portion at the 125% position is in a range from 2.5 to 4.0 times a groove width W2 in the tyre circumferential direction of the outer groove portion at the tread edge.

11. The tyre according to claim 1, wherein
in each first shoulder lateral groove, a ratio Sa/Sb of the groove area Sa of the inner groove portion to the groove area Sb of the outer groove portion is in a range from 0.28 to 0.40.

12. The tyre according to claim 1, wherein
the second shoulder lateral grooves have shorter length in the tyre axial direction than length in the tyre axial direction of the plurality of first shoulder lateral grooves.

13. The tyre according to claim 12, wherein
each second shoulder lateral groove comprises a second inner groove portion extending inward in the tyre axial direction of the tread edge and a second outer groove portion extending outward in the tyre axial direction of the tread edge, and
each second shoulder lateral groove, in a tread development view, has a groove area Sc of the second outer groove portion between the tread edge and the 125% position being greater than a groove area Sd of the second inner groove portion.

14. The tyre according to claim 13, wherein
a ratio (Sd/Sc) of the groove area Sd of the second inner groove portion to the groove area Sc of the second outer groove portion is in a range from 0.20 to 0.35.

15. The tyre according to claim 13, wherein
a ratio (Sd/Sc) of the groove area Sd of the second inner groove portion to the groove area Sc of the second outer groove portion is greater than a ratio (Sa/Sb) of the groove area Sa of the inner groove portion to the groove area Sb of the outer groove portion of each first shoulder lateral groove.

16. The tyre according to claim 14, wherein
a ratio (Sd/Sc) of the groove area Sd of the second inner groove portion to the groove area Sc of the second outer groove portion is greater than a ratio (Sa/Sb) of the groove area Sa of the inner groove portion to the groove area Sb of the outer groove portion of each first shoulder lateral groove.

17. The tyre according to claim 13, wherein
the second outer groove portion comprises a second width-increasing portion in which a groove width thereof increases continuously outwardly in the tyre axial direction and a second width-decreasing portion in which a groove width thereof decreases outwardly in the tyre axial direction.

18. The tyre according to claim 17, wherein
the second width-decreasing portion traverses the 125% position.

19. The tyre according to claim 1, wherein
the third shoulder lateral grooves have a groove width W7 equal to or more than 80% a groove width W3 of the inner groove portions.

20. A tyre comprising:
a tread portion comprising a tyre equator, a tread edge, a tread width (TW) which is a distance in a tyre axial direction from the tyre equator to the tread edge, and a shoulder land portion comprising the tread edge, the shoulder land portion being provided with a plurality of first shoulder lateral grooves,
each first shoulder lateral groove comprising an inner groove portion extending inwardly in the tyre axial direction of the tread edge and an outer groove portion extending outwardly in the tyre axial direction of the tread edge, wherein
each first shoulder lateral groove, in a tread development view, has a groove area Sb of the outer groove portion extending in a region from the tread edge to an 125% position of the tread width that is greater than a groove area Sa of the inner groove portion,
the tread portion further comprises a shoulder circumferential groove arranged adjacent to the shoulder land portion,
the shoulder circumferential groove comprises a plurality of curved portions projecting in the tyre axial direction, and the plurality of first shoulder lateral grooves extends from the curved portion,
in each first shoulder lateral groove, the outer groove portion comprises an inner position, an outer position located outwardly in the tyre axial direction from the inner position by 5% to 20% of the tread width, and an intermediate position located at a center between the inner position and the outer position in the tyre axial direction, and
a ratio (Hb/Ha) of a groove width Hb in a tyre circumferential direction of the intermediate position to a groove width Ha in the tyre circumferential direction of the inner position is smaller than a ratio (Hc/Hb) of a groove width Hc in the tyre circumferential direction of the outer position to the groove width Hb.

* * * * *